US010438478B2

(12) United States Patent
Siwak et al.

(10) Patent No.: US 10,438,478 B2
(45) Date of Patent: Oct. 8, 2019

(54) INTRUSION DETECTION SYSTEM

(71) Applicant: PRACTECOL, LLC, St. Louis, MO (US)

(72) Inventors: Greg Siwak, Clayton, MO (US); Ted Siebenman, Ballwin, MO (US); Max Witt, St. Louis, MO (US)

(73) Assignee: Practecol, LLC, Clayton, MO (US)

( * ) Notice: Subject to any disclaimer, the term of this patent is extended or adjusted under 35 U.S.C. 154(b) by 380 days.

(21) Appl. No.: 14/795,815

(22) Filed: Jul. 9, 2015

(65) Prior Publication Data

US 2016/0012713 A1 Jan. 14, 2016

Related U.S. Application Data

(60) Provisional application No. 62/022,530, filed on Jul. 9, 2014.

(51) Int. Cl.

| | |
|---|---|
| ***H04N 7/18*** | (2006.01) |
| ***G08B 25/10*** | (2006.01) |
| ***G08B 13/22*** | (2006.01) |
| ***G08B 13/196*** | (2006.01) |
| ***G08B 25/08*** | (2006.01) |
| *G08B 13/16* | (2006.01) |
| *G08B 13/19* | (2006.01) |
| *G08B 29/18* | (2006.01) |

(52) U.S. Cl.

CPC ......... *G08B 25/10* (2013.01); *G08B 13/1966* (2013.01); *G08B 13/19621* (2013.01); *G08B 13/19656* (2013.01); *G08B 13/19682* (2013.01); *G08B 13/19684* (2013.01); *G08B 13/22* (2013.01); *G08B 25/08* (2013.01); *G08B 13/1672* (2013.01); *G08B 13/19* (2013.01); *G08B 13/19636* (2013.01); *G08B 13/19669* (2013.01); *G08B 13/19697* (2013.01); *G08B 29/183* (2013.01)

(58) Field of Classification Search

CPC ........................................................ G08B 25/10
USPC .................................................. 340/541, 546
See application file for complete search history.

(56) References Cited

U.S. PATENT DOCUMENTS

| | | | | |
|---|---|---|---|---|
| 4,797,657 | A * | 1/1989 | Vorzimmer .......... | G08B 25/008 340/430 |
| 4,857,912 | A | 8/1989 | Everett, Jr. et al. | |
| 5,283,549 | A | 2/1994 | Mehaffey et al. | |
| 6,833,788 | B1 * | 12/2004 | Smith et al. .................. | 340/541 |
| 7,161,479 | B2 * | 1/2007 | Sobol ............................ | 340/506 |
| 2008/0042824 | A1 * | 2/2008 | Kates ................... | G08B 13/183 340/522 |
| 2013/0155242 | A1 * | 6/2013 | Hevia .............. | G08B 13/19658 348/152 |
| 2013/0295911 | A1 | 11/2013 | Chen | |

(Continued)

OTHER PUBLICATIONS

International Search Report, International Patent Application No. PCT/US2015/039798, dated Sep. 25, 2015, 15 pages.

*Primary Examiner* — Brent Swarthout
(74) *Attorney, Agent, or Firm* — Lewis Rice LLC

(57) ABSTRACT

Systems and methods for intrusion detection using a stand-alone monitor communicating with a monitoring application on a user device. The monitor is generally a self-contained device that does not require third party monitoring services and communicates directly with the user device, or over a local network, such as a home network.

5 Claims, 10 Drawing Sheets

(56) References Cited

U.S. PATENT DOCUMENTS

| | | | |
|---|---|---|---|
| 2013/0314542 | A1 | 11/2013 | Jackson |
| 2014/0139678 | A1 | 5/2014 | Moriarty et al. |

* cited by examiner

INTRUSION DETECTION SYSTEM

CROSS REFERENCE TO RELATED APPLICATIONS

This application claims benefit of U.S. Provisional Patent Application No. 62/022,530, filed Jul. 9, 2014, the entirety of which is incorporated herein by reference.

BACKGROUND

1. Field of the Invention

This disclosure is related to the field of intrusion detection, and more specifically to an intrusion monitor useable without the need to install electronics into a residence.

2. Description of the Related Art

Burglary is generally defined as breaking into a residence or other structure in order to commit theft. It is often a crime of opportunity, where a potential burglar locates an empty residence through a variety of measures and then enters the residence to take available money and easily sellable materials such as electronics and jewelry.

Burglary has been defined as criminal since the very first written criminal laws existed and is more prevalent than most people realize. It has been estimated that a burglary occurs in the United States every 15 seconds and that one in thirty-five homes will be burglarized in any given year. Burglary generally presents both a loss of property (with a value generally around $1500) and, often, a loss of far more. Having a home burglarized can result in loss of feelings of comfort or security and physical damage to the residence in addition to the loss of the items stolen.

While burglary is quite common, it is also reasonably easy to defeat. Any system which makes breaking into a residence take longer, or more likely to be detected, will often result in a burglary deterrence and therefore a potential burglar will pass on one residence in favor of an easier target. For this reason, homeowners regularly utilize all sorts of different deterrents including, but not limited to, sophisticated electronic burglary systems, automatic lighting systems, and dogs to deter would-be-burglars.

As effective as electronic systems can be, many of them share common problems. They are not readily useable in temporary or rental housing, they are expensive to install, and they require the presence of a third party monitoring company. In many respects, the technology of the intrusion alarm is based on technology which is from a prior generation. In today's modern era, the consumer is more mobile, both in their housing with rental and temporary property being utilized to a greater extent, and in their person where computer technology that a decade ago was confined to the desktop is now carried with them. Even with this, however, the electronic security system is little changed from what it was years ago.

The attitude of the modern consumer has also changed. The modern consumer is used to products which give control to them as opposed to a third party. Fountain drink dispensers have come out from behind the counter, the gas station attendant has been replaced by an in-pump credit card reader, and people can get information on anything and everything from their smartphones. The electronic security system, however, is still firmly grounded in the notion that security is best handled by professionals, even when there is no such need. In today's world there is demand for security systems that can be used anywhere the consumer may be located, whether its permanent housing, temporary housing, a hotel room, or even in a camper or their car.

In effect, the intrusion alarm which is a capital improvement in the form of a fixture attached to a residence is no longer a necessarily desirable upgrade in the same way that the advent of digital music distribution has rendered the built-in CD player almost a hindrance instead of a benefit. Where it used to be that the presence of an installed security system could increase a home's resale even though the new owner could still need to pay for the service to make it useful, such systems are no longer of interest to many buyers that would rather have control over who their security provider is, and particularly to eliminate the expense and hassle of having a security provide at all when they can handle the monitoring of the system themselves.

SUMMARY

The following is a summary of the invention which should provide to the reader a basic understanding of some aspects of the invention. This summary is not intended to identify critical components of the invention, nor in any way to delineate the scope of the invention. The sole purpose of this summary is to present in simplified language some aspects of the invention as a prelude to the more detailed description presented below.

Because of these and other problems in the art, described herein, among other things, is a standalone, self-contained intrusion detection monitor comprising: a housing; a wireless communication system enclosed in the housing; one or more intrusion detection systems enclosed in the housing; a microprocessor enclosed by the housing and operatively coupled to the wireless communication system and operatively coupled to the one or more intrusion detection systems, the microprocessor causing the wireless communication system to transmit a monitoring signal if the microprocessor determines that the output of at least one of the one or more intrusion detection systems is indicative of a human intruder; and a power supply supplying power to the wireless communication system, the microprocessor, and the one of more intrusion detection systems.

In an embodiment, each one of the one or more intrusion detection systems is selected from the group consisting of: a microphone, an infrared sensor, a motion detector, and a camera.

In another embodiment, the wireless communication system comprises an antenna communicating over a telecommunications network.

In a further embodiment, the transmitted alert is configured to be received by a wireless user device.

In a still further embodiment, the wireless user device is a tablet computer or smart phone.

In a still further embodiment, the microprocessor determines whether the output is indicative of a human intruder based upon at least one of the direction of detected movement, the size of a detected moving object, the location of detected movement.

In a still further embodiment, at least one of the one or more intrusion detection systems is a digital video camera and the monitoring signal comprises video data generated by the digital video camera.

Also described herein, among other things, is an intrusion detection system comprising: a handheld device of a user; and a standalone, self-contained intrusion detection monitor communicatively coupled to the handheld device over a communication network and comprising: a wireless communication system; one or more intrusion detection systems; and a microprocessor operatively coupled to the wireless communication system and operatively coupled to the one or more intrusion detection systems, the microprocessor causing the wireless communication system to transmit to the handheld device a monitoring signal if the microprocessor determines that the output of at least one of the one or more intrusion detection systems is indicative of an unauthorized intruder.

In an embodiment, the handheld device includes: a microprocessor; a display; a non-transitory, computer-readable medium having stored thereon computer-readable instructions which, when executed by the handheld device microprocessor present to a user of the handheld device an application, the application causing to be displayed to the user on the display a visualization of the monitoring signal received by the handheld device.

In another embodiment, the application comprises a graphical user interface manipulable by the user to cause the monitoring signal received by the handheld device to be stored on the non-transitory, computer-readable medium of the handheld device.

In a further embodiment, the application comprises a graphical user interface manipulable by the user to indicate whether the displayed visualization depicts an unauthorized intruder.

In a still further embodiment, at least one of the one or more intrusion detection systems is a digital video camera and the monitoring signal comprises video data generated by the digital video camera.

In a still further embodiment, the wireless communication system transmits the monitoring signal to the handheld device only via a private local wireless network.

In a still further embodiment, the local private network is administered by a residential wireless router.

In a still further embodiment, the microprocessor determines whether the output is indicative of an unauthorized intruder based upon at least one of the direction of detected movement, the size of a detected moving object, the location of detected movement.

Also described herein, among other things, is a computer-implemented method for detecting an unauthorized intruder comprising: receiving, by an application executing on a handheld user device communicably coupled to an intrusion detection system over a wireless telecommunications network, a digital video feed comprising digital video data generated by the intrusion detection system placed in a residence; displaying, by the application on a display of the handheld user device, the received digital video feed; displaying, by the application on the display, a graphical user interface comprising a user input component configured for a user of the handheld user device to indicate whether the displayed digital video feed indicates the presence of an unauthorized intruder in the residence; receiving, from the user via the user input component, an indication that the displayed digital video feed indicates the presence of an unauthorized intruder in the residence; in response to the received indication of the presence of an unauthorized intruder in the residence, storing on a non-volatile computer-readable medium of the handheld device a copy of the received digital video feed.

In an embodiment, the handheld user device is communicably coupled to the intrusion detection system only via a private local wireless network.

In another embodiment, the local private wireless network is administered by a residential wireless router.

In a further embodiment, the private local wireless network is a non-virtual network.

In a still further embodiment, the handheld user device is a smart phone or tablet computer.

In a still further embodiment, the handheld user device is a wearable computer.

DESCRIPTION OF THE PREFERRED EMBODIMENT(S)

Figure 1:
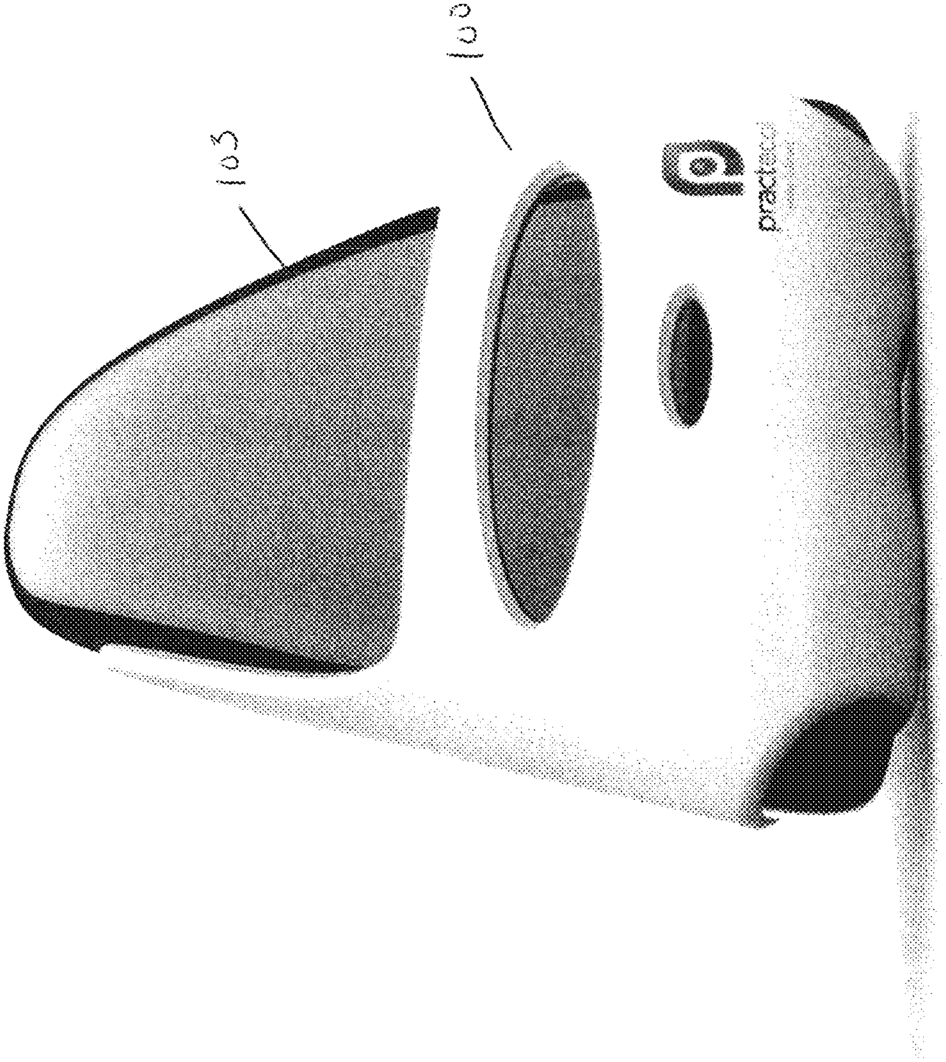
FIG. 1 provides a front perspective view of an embodiment of a monitor of the present invention.
Figure 2:
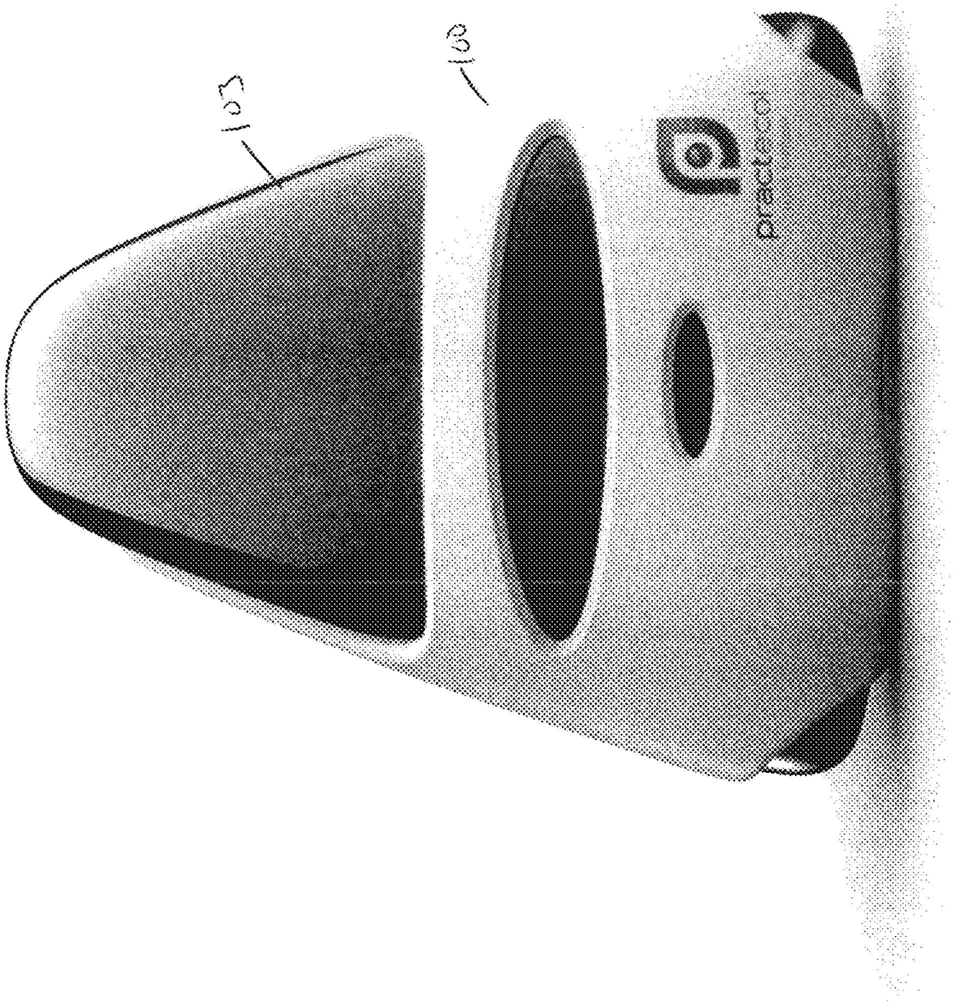
FIG. 2 provides a front view of the embodiment of FIG. 1.
Figure 3:
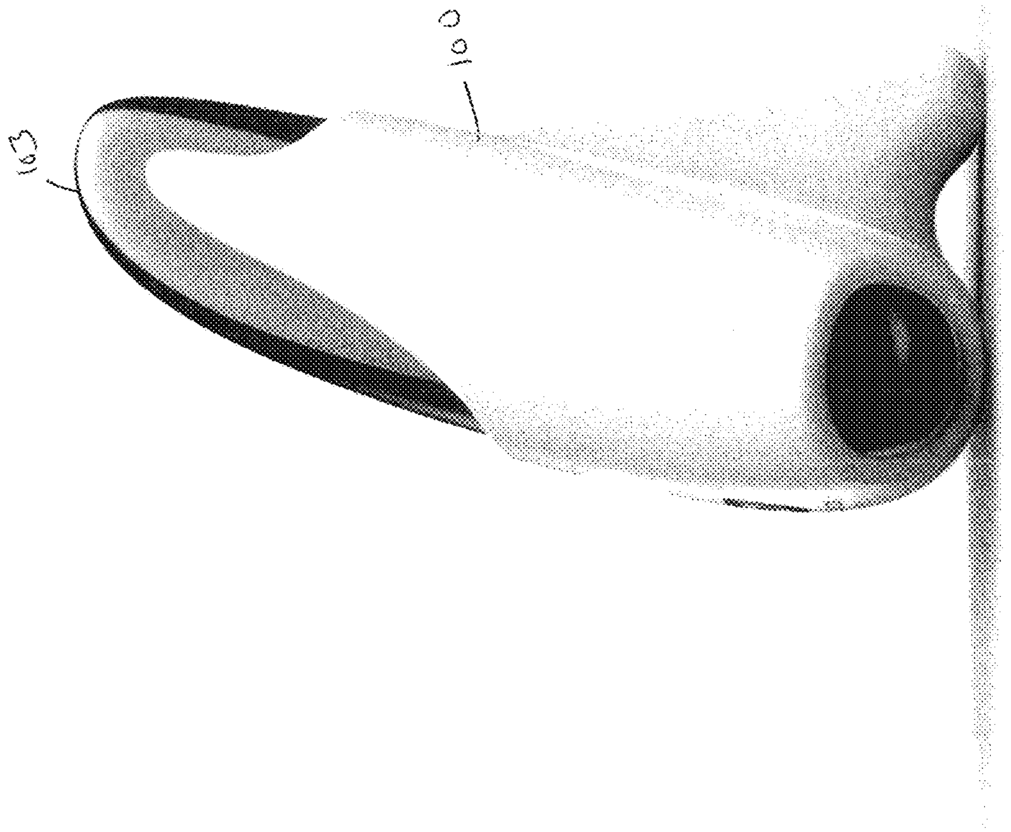
FIG. 3 provides a side view of the embodiment of FIG. 1.
Figure 4:
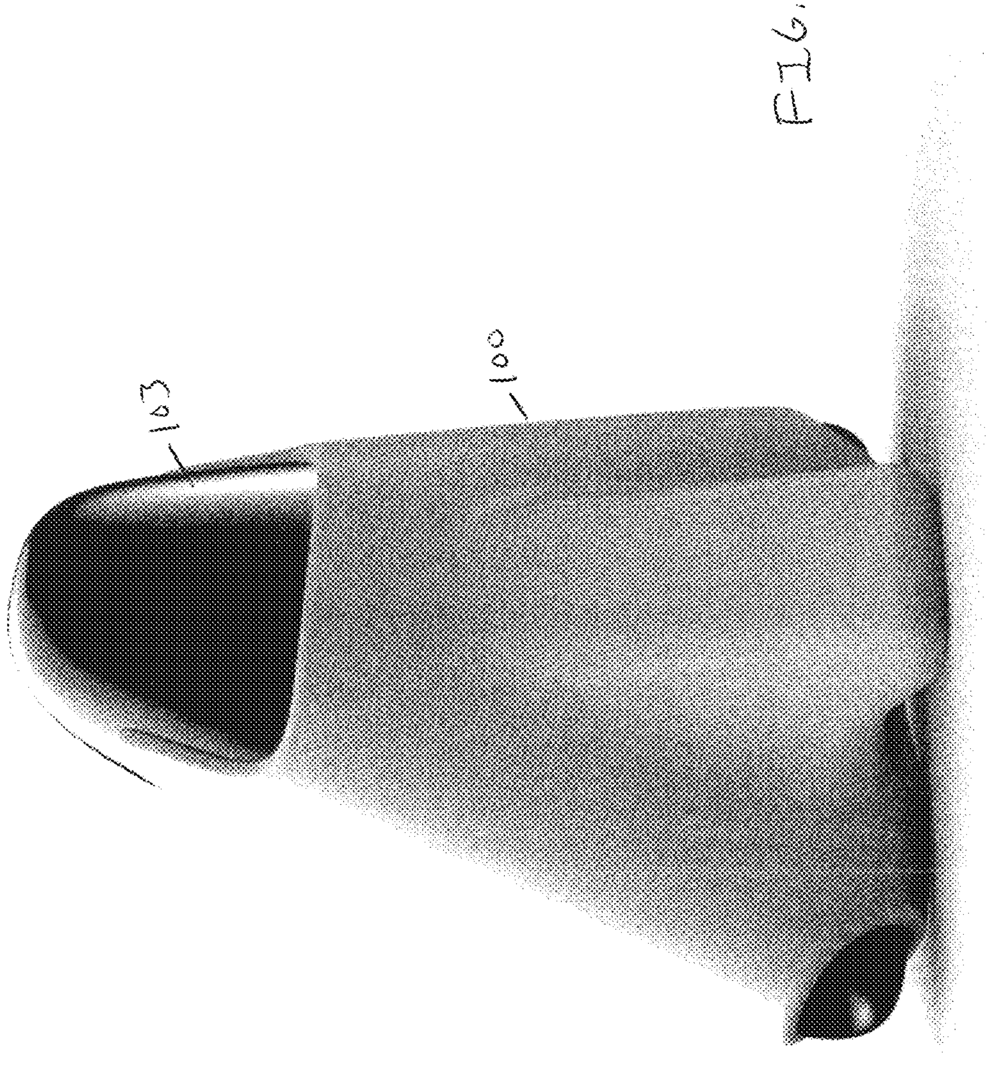
FIG. 4 provides a rear perspective view of the embodiment of FIG. 1.
Figure 5:
FIG. 5 provides a top view of the embodiment of FIG. 1.
Figure 6:
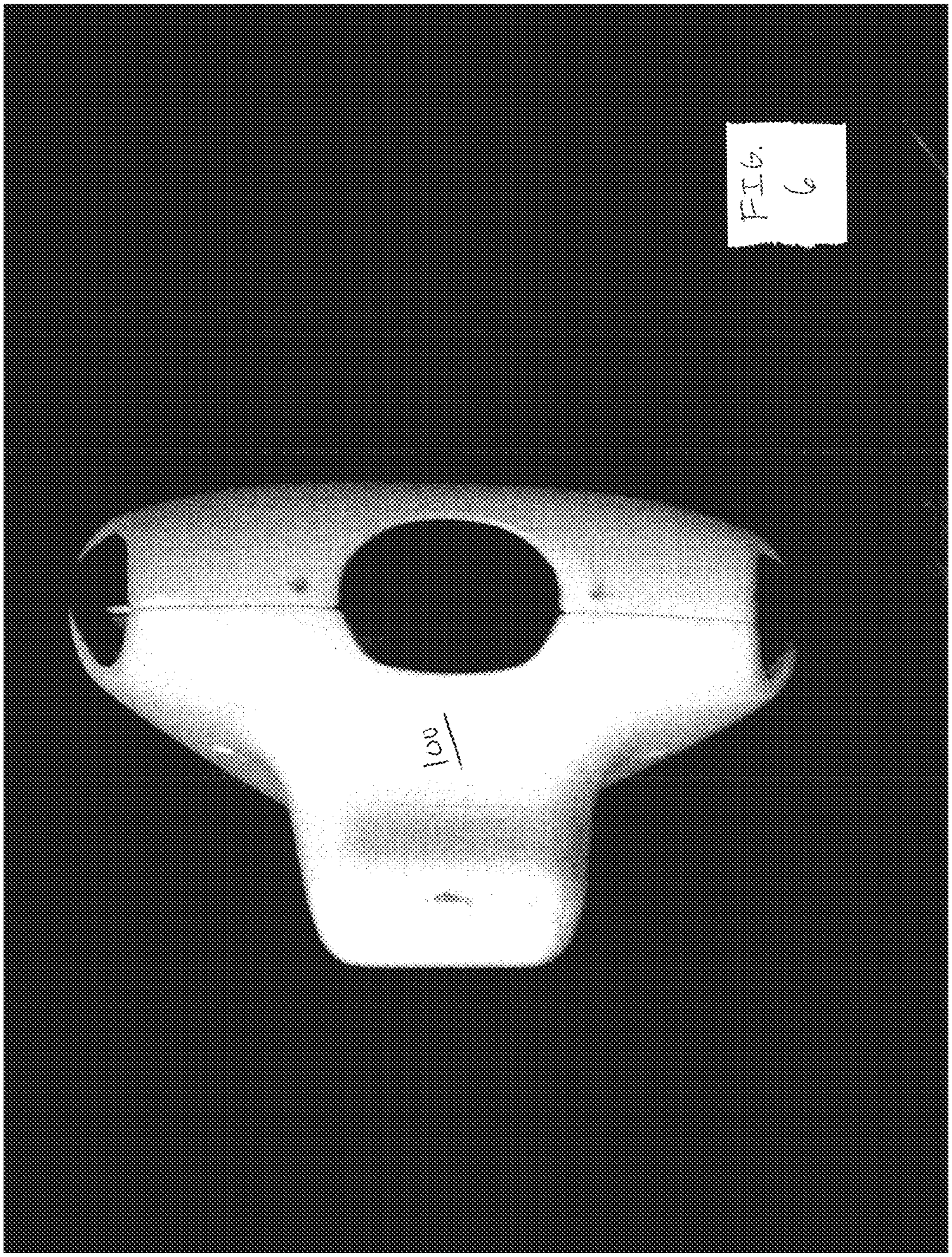
FIG. 6 provides a bottom view of the embodiment of FIG. 1.

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and apparatus. As various changes could be made in the above constructions without departing from the scope of the disclosures, it is intended that all matter contained in the above description or shown in the accompanying drawings shall be interpreted as illustrative and not in a limiting sense.

Throughout this disclosure, the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, smart phones, tablet computers, mobile devices, server farms, hardware appliances, minicomputers, mainframe computers, video game consoles, handheld video game products, and wearable computing devices including but not limited to eyewear, wristwear, pendants, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Throughout this disclosure, terms used herein to describe or reference media holding software, including without limitation terms such as "media," "storage media," and "memory," may include or exclude transitory media such as signals and carrier waves.

Throughout this disclosure, the terms "web," "web site," "web server," "web client," and "web browser" refer generally to computers programmed to communicate over a network using the HyperText Transfer Protocol ("HTTP"), and/or similar and/or related protocols including but not limited to HTTP Secure ("HTTPS") and Secure Hypertext Transfer Protocol ("SHTP"). A "web server" is a computer receiving and responding to HTTP requests, and a "web client" is a computer having a user agent sending and receiving responses to HTTP requests. The user agent is generally web browser software.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including but not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g., "a remote host"), or may, in verb form, refer to a server providing a service over a network ("hosts a website"), or an access point for a service over a network.

Described herein is an intrusion detection system which is useable without the need to install electronics into a residence. It is therefore often referred to as a standalone or independent system. The system generally comprises a detection module, which can include detection apparatus such as a camera, infrared (IR) detector, motion detector, or microphone connected with a processor for interpreting signals which is simply plugged into an available power source, such as a wall outlet, or is provided with a self-contained power supply. The system can then utilize the signals generated by the detection module to record an intrusion and/or to provide deterrent mechanisms to an intrusion.

While deterrent systems generally are designed to warn a burglar or potential burglar that the system is present and has been triggered (e.g. lights or sirens), it is contemplated in an embodiment that deterrent mechanisms can be included which may be remote (e.g. recording video to a remote location). While such a system as this does not necessarily deter the initial burglary event (e.g. the breaking-in), such systems still provide deterrence as a burglar, upon seeing the system, can be made to understand that they have already been detected in a manner that cannot be readily avoided. Therefore, the burglar can be deterred from taking further action as they will quickly flee to avoid responding authorities or creating additional evidence against themselves. In an embodiment, an alert or siren has a range of about 75 to about 120 decibels.

The systems and methods discussed herein are useable in virtually any type of intrusion detection, but are particularly useful in locations where the resident cannot make physical, permanent, changes to the location, generally because they are a temporary resident there. This can include, but is not limited to offices, dorm rooms, hotels, and rental properties. The system generally utilizes existing infrastructure to provide for some of its functions and therefore does not require a specialized installation. Instead, it is considered "standalone". In particular, the monitor, which is the only portion of the system generally present at the residence, can draw power from standard wall outlets and can communicate with remote locations using existing Wi-Fi™, Bluetooth™, cellular, or other wired or wireless communication networks that are already in place instead of needing dedicated systems.

Figure 7A:
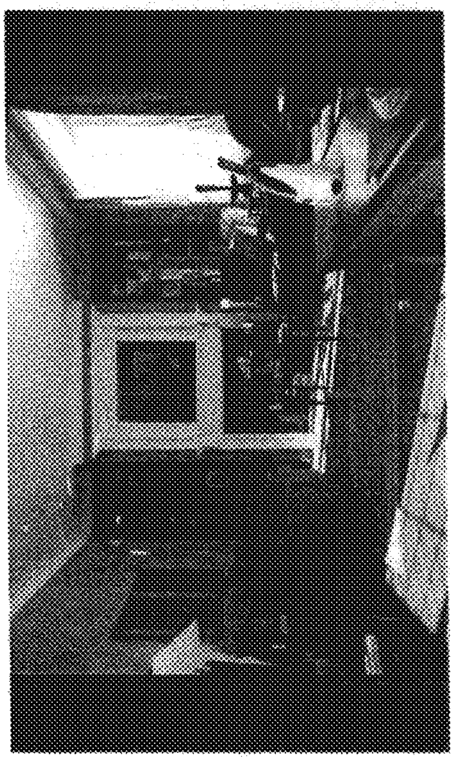
FIGS. 7A-7C provide various views of the monitor of FIG. 1 in a variety of different environments.
Figure 7B:
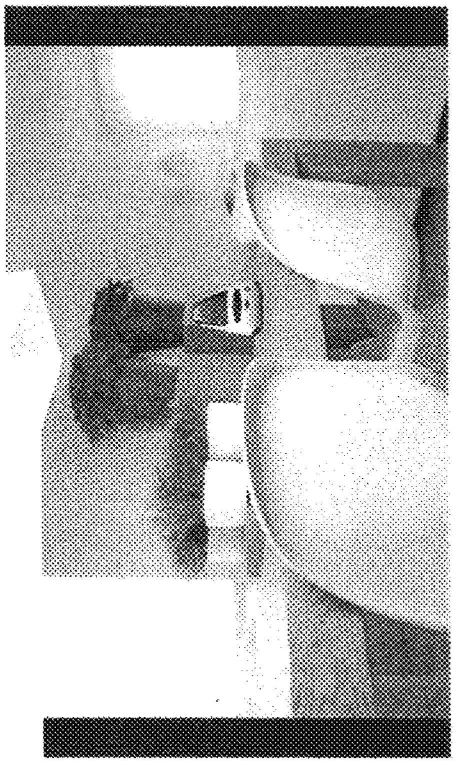
Figure 7C:
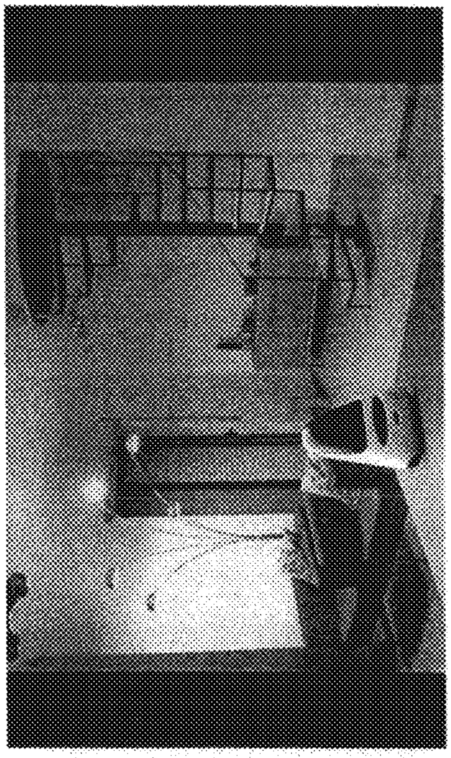

FIGS. 1-6 show multiple views of a first general embodiment of an intrusion detection system monitor (100) of the present invention. The monitor (100) is designed to be positioned in a fashion where a lens (103) is viewing an area where a burglar likely would be present. Some examples of this are shown in FIGS. 7A-7C where the monitor (100) is shown placed on a piece of furniture to provide a relatively unobstructed view of a room. The monitor (100) will generally include a detection system which is located behind the lens (103) and has a field of view corresponding to that of the lens (103).

Figure 8:
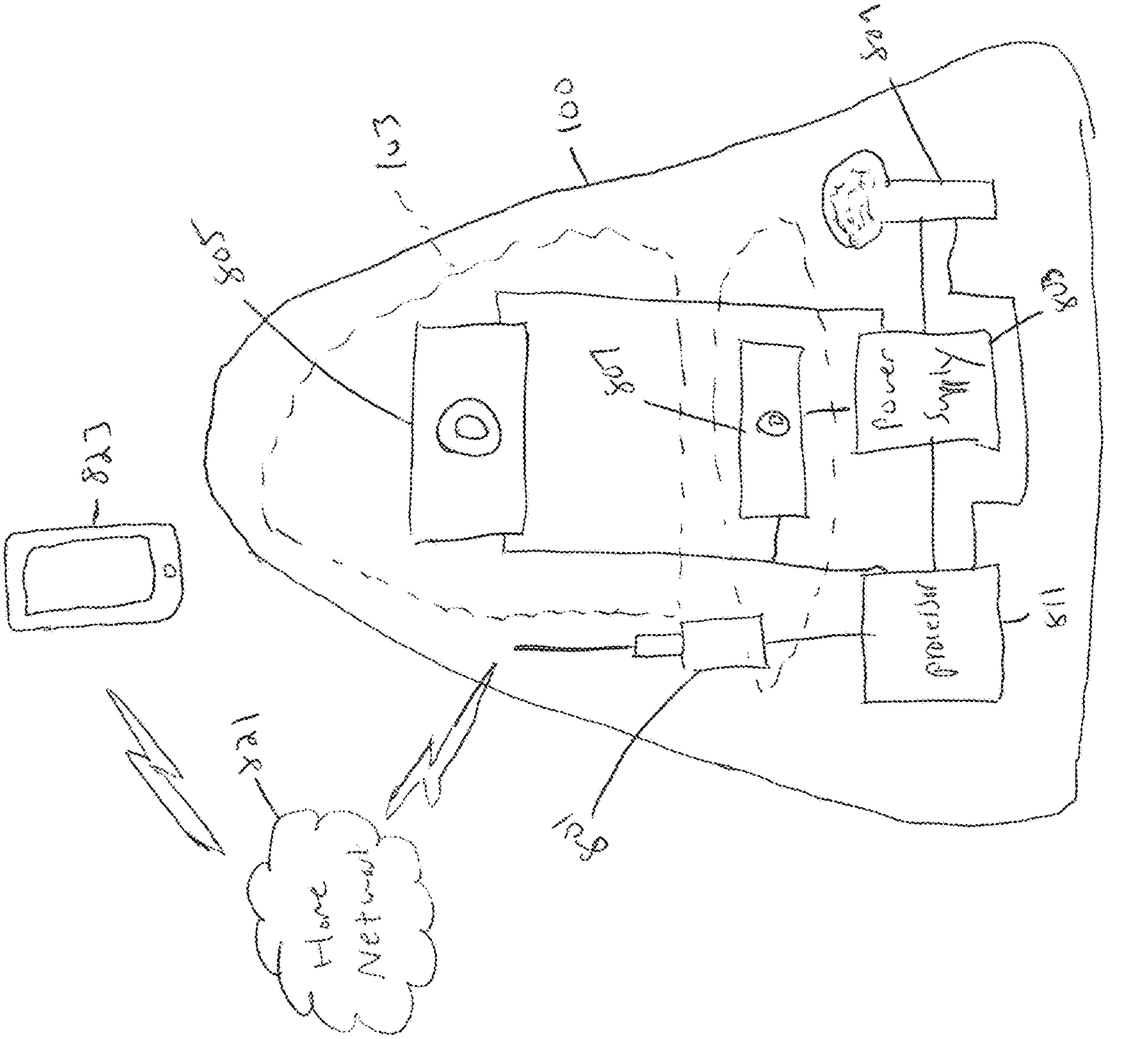
FIG. 8 provides a general block diagram of the internal components of an embodiment of a monitor and the communication performed by the monitor.

As shown in FIG. 8 in a general block format, the monitor (100) will generally include internally a communication system such as antenna (801) which is capable of communication through an established communication network, such as, but not limited to, a home wireless (e.g. Wi-Fi™) router and network, a cellular communications network, a Bluetooth® capable device (e.g. a cellular phone), or via connection to a wired communications network such as phone line, cable TV line, or home internet cable. The monitor (100) will generally be a self-contained device which will usually be configured to be simply plugged in and connected to the network. Generally, power will be from a standard wall outlet but in alternative embodiments of a power supply (803) such as, but not limited to, a battery pack, capacitor, solar panel, or kinetic storage device may be provided instead of or in addition to line power.

The monitor (100) will generally include some form of detection apparatus as contemplated above. The detection apparatus is a device whose purpose is to detect a signal indicative of an intruder. Generally, the detection apparatus can comprise a visual apparatus, such as a camera, motion detector or IR detector, or a sonic apparatus such as a microphone. Multiple such apparatuses may also be combined together with a system such as is shown in FIG. 8 where the monitor (100) includes a video camera (805), an infrared (IR) camera (807), and a microphone (809) that can all operate together or be used independently depending on desired operation.

In an embodiment comprising a camera module, the camera module comprises a VGA camera. In a further embodiment, the camera module comprises a wireless communication system, over which the camera feed is streamed or transmitted. Such wireless communication system may be, include, or utilize a wireless communications protocol and corresponding hardware implementing same in the IEEE 802.11 family of protocols. Video compression may also be utilized in an embodiment to increase video throughput while consuming less bandwidth. By way of example and not limitation, an embodiment may utilize a video coding format, such as H.264 or MPEG-4. The camera may be mounted within a housing such that the camera angle may be manually set. By way of example and not limitation, this may be done through use of one or more ball joints. In an embodiment, the camera module may comprise a removable covering, which protects the lens and improves the aesthetics of the device. In a further embodiment, the removable covering is made of glass or another translucent or transparent material. In another embodiment, the removable covering may be tinted.

The detection apparatus will generally be paired with a processor (811) which is capable of interpreting the output of the detection apparatus and making a determination if the detected signal is indicative of an intruder, or of something else. For example, an IR detector or camera-paired processor may be able to determine if a signal is sufficiently large and moving in an expected fashion to represent a human being, as opposed to the signal being generated by a family pet (which would be much smaller and may move in a different fashion) or of a fly which has landed on the lens (103). Similarly, such a system may be able to detect that the motion is that of a human as opposed to drapes being moved by the activation of a central heating system or simply changing IR signals due to distribution of heated or cooled air within the room.

In addition to a detection apparatus, the system may include a recording apparatus. This may be within the monitor (100), but generally will not be. Instead, the communication system (801) will be used to allow for the feed from the detection device(s) to be recorded remotely via transmission from the monitor (100). This can allow the detection by the system to serve as evidence and to provide additional detail to a human user of the system should such feed be provided and/or recorded on their remote device. In an embodiment, the user's device (823) can be used to store the recording.

Generally, should the system be triggered (e.g. a potential burglar be detected), the processor (811) will generally activate a communication system (801) which will attempt to communicate with a human user. This is usually the person who purchased and installed the monitor (100), but that is by no means required. Specifically, the communication system (801) will often comprise electronics for accessing a known communication network (such as a home wireless network (821)) and transmitting information to a remote users electronic device such as a smartphone (823) or computer using a standard communication protocol. The user of the device (823) is then able to review the information, such as a video feed, and determine that if the "intruder" is, for example, just a child who arrived home early, or is actually someone unauthorized to be in view of the monitor (100). The user may then have an ability to react to the feed such as, but not limited to, by triggering audible and/or visual alarms at the monitor (100), initiating a call to law enforcement, or initiating a video recording to generate evidence against the burglar. In an embodiment, the feed itself can be live streamed to law enforcement allowing them to know, in near-real time, where the monitor (100) has seen the burglar. This can allow for a far more efficient police response.

In an embodiment, the monitor is configured to disregard or ignore the presence of pets. This may be done, for example, by limiting the vertical scanning range of the device such that movement only at a pet's level (i.e., near the floor) is not detected, or is detected but is not interpreted as an intruder. Such an embodiment is generally referred to as "pet-immune" herein. In a further embodiment, a pet-immune monitor (100) has a scanning range of about 30 feet. In another further embodiment, a pet-immune monitor (100) has a detection angle of about 110 degrees. Other ranges and angles are possible in a particular embodiment, and may vary based on various factors, including but not necessarily limited to the type and size of pet which will be in the residence where the monitor (100) will be used.

It is generally contemplated herein that the intrusion detection systems (100) described in this disclosure interacts in real-time or near real-time with a user device (823)

application. Embodiments of such an application (900) are depicted in FIGS. 9-12. The user device application (900) will generally run on a user device (823) using the native operating system and features of that device (823), and will generally include a user interface having user input and output or elements and components. Preferably, the user interface utilizes graphical user interface components and elements, but the precise content of the interface will necessarily vary from embodiment to embodiment, and may also vary over time as design aesthetics and user preferences evolve and change.

In an embodiment, a user device application (900) includes a device (823) pairing or registration feature, with accompanying interface elements. This generally enables the application (900) to "pair" or otherwise synchronize or connect with the intrusion detection systems (100) described herein. For example, most modern-day consumer devices (823) support Bluetooth® pairing.

Alternatively, the application (900) may connect to or synchronize with the intrusion detection device (100), using a different wireless communications technique or protocol, such as Wi-Fi™ or other radio-based network communications protocols over a home network (821). This feature allows the application (900) to pair with the intrusion detection monitor (100) so that when the monitor (100) generates alerts or other signals to transmit to the application (900), the particular user device (823) for which the signals are intended are readily identifiable by the intrusion detection monitor (100). This may be done using, by way of example and not limitation, a MAC address, a network address, or a device serial number or other identifier.

The application (900) also allow for connecting to multiple monitors (100). This is particularly useful where the user is monitoring multiple devices (100) within a single residence, or where the user has multiple devices (100) in multiple residences.

In an embodiment, a monitor (100) is paired with the application (900) by connecting the monitor (900) to a power source, then connecting the monitor (900) to a wireless router. The monitor (900) is then added to the local network (821), including, without limitation, by using Wi-Fi™ Protected Setup ("WPS"), such as with push button configuration. In such an embodiment, the user selects the WPS button on the router, and a WPS button on the intrusion detection monitor (100), and WPS technology connects the monitor (900) to the router and the local network (823). The user may then download the application (900) and pair the application (900) with the monitor (900).

Figure 9:
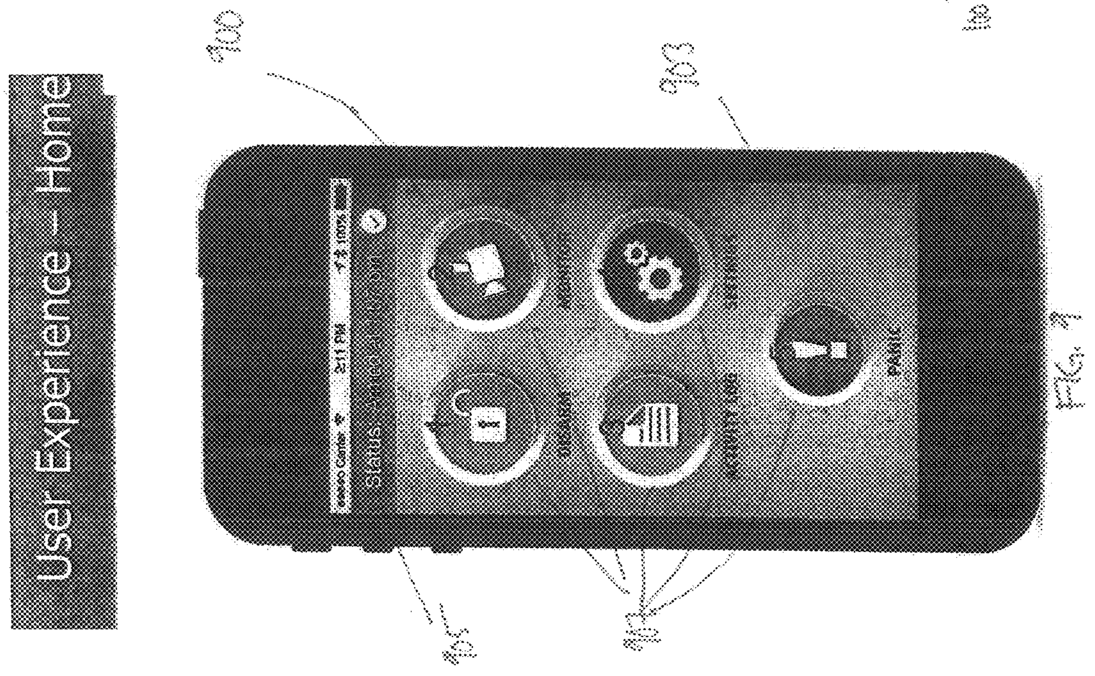
FIG. 9 provides an embodiment of a home screen in an embodiment of an application implementing the systems and methods.

In an embodiment, the application (900) includes a "home screen" or other startup or default screen, which will generally appear when the application is initially started. An embodiment of a home screen for use in the application is depicted in FIG. 9. In the typical embodiment, the home screen (903) will comprise output elements (905) showing the general status of the intrusion detection systems (100) being monitored by the application (900), or otherwise connected to or paired with the application (900). By way of example and not limitation, the home screen (903) may show (905) which devices (100) are armed or disarmed, when the device (100) was armed or disarmed, the location where the device has been placed, a thumbnail of the current image or video being captured by the device (100), an indicator of an air condition with the device (100), if any, a status bar (905), and so forth.

In an embodiment, the home screen (903) may further comprise user input components (907) allowing the user to quickly provide instructions, or access key information, without having to navigate through menus. By way of example and not limitation, such user input components (909) may include an arm/disarm button, a monitor button, an activity log button, a settings button, and/or a siren button. Although buttons are generally contemplated, another user input element (907) may be substituted for a button, including, without limitation, gesture-based input and/or voice-based input. Where appropriate, selecting or operating such user input components (907) may cause other screens to load or otherwise appear in the application (900).

Figure 10:
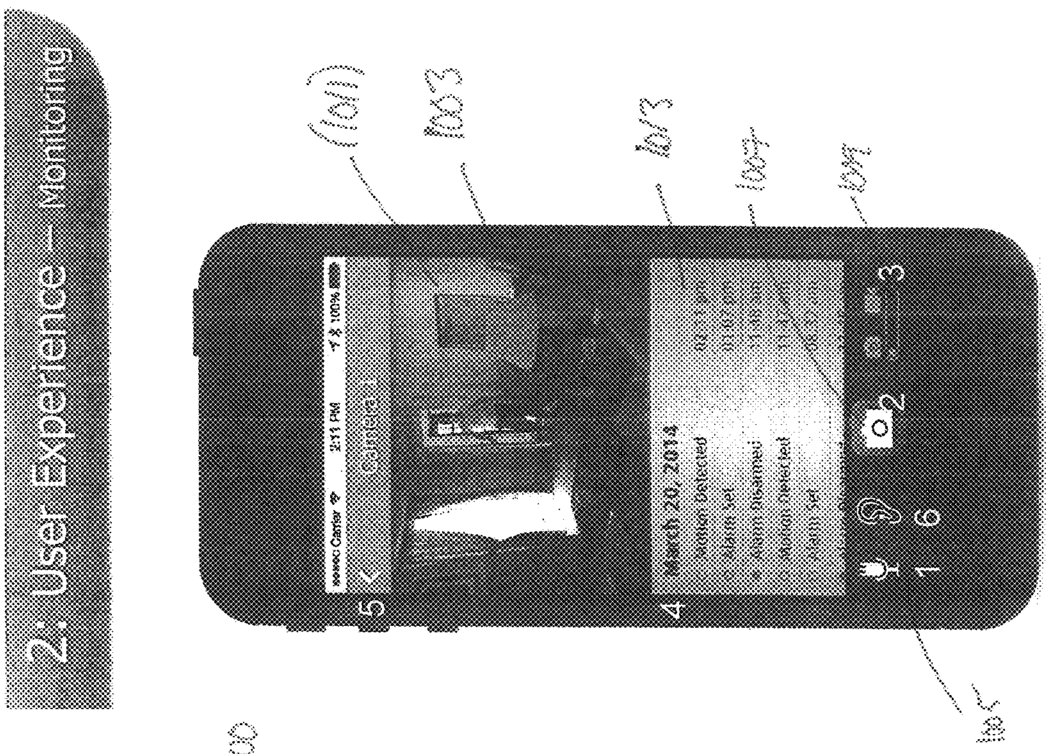
FIG. 10 provides an embodiment of a monitoring screen in an embodiment of an application implementing the systems and methods.

In an embodiment, the application includes a monitor screen. An embodiment of a monitoring screen (1003) is depicted in FIG. 10. The monitor screen (1003) may also comprise a photo or video stream showing the data being captured by the monitor (100) in real time or near real time. In an embodiment, the monitor screen (1003) may further comprise a summary (1013) of activity detected by the devise (100). This screen (1003) may appear after the user selects a monitor button (907) or other monitor user input from the home screen (903). The monitor screen (1003) may comprise user input and output components, including, without limitation, a sound on/off button (1005), a record button, and/or a still photo/video toggle (1009).

Figure 11:
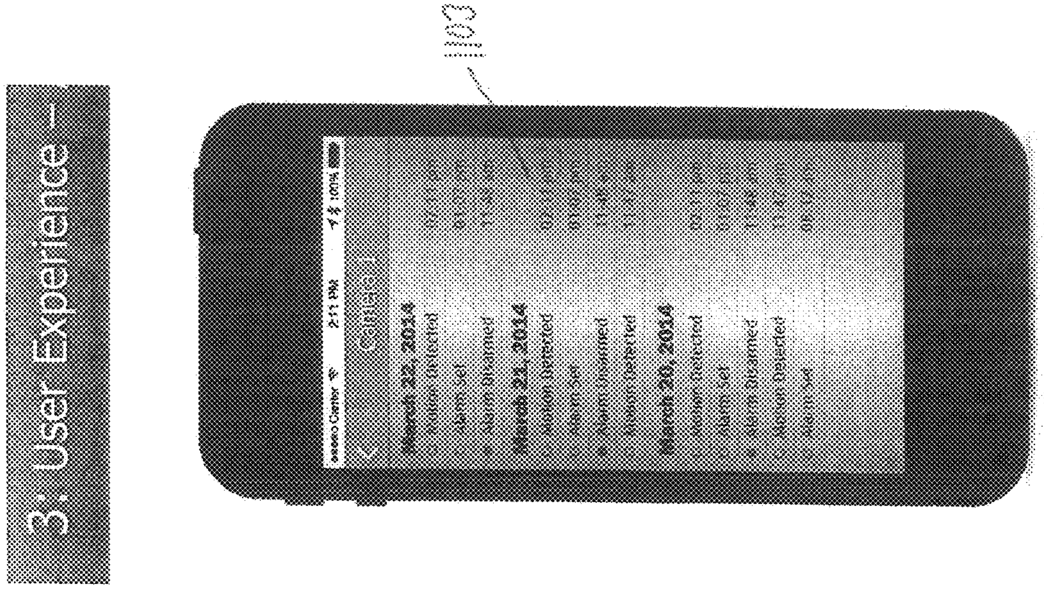
FIG. 11 provides an embodiment of a activity log in an embodiment of an application implementing the systems and methods.

In another embodiment, the application may include an activity log screen (1103), which may appear or be accessible by selecting the activity log button on the home screen (903). An embodiment of an activity log screen (1103) is depicted in FIG. 11. The activity log (1108) may display to the user any activity pertaining to the monitor (100). In an embodiment, the activity log (1103) on this screen (1103) may contain data which is the same or similar as that displayed on the monitoring screen (1003).

Figure 12:
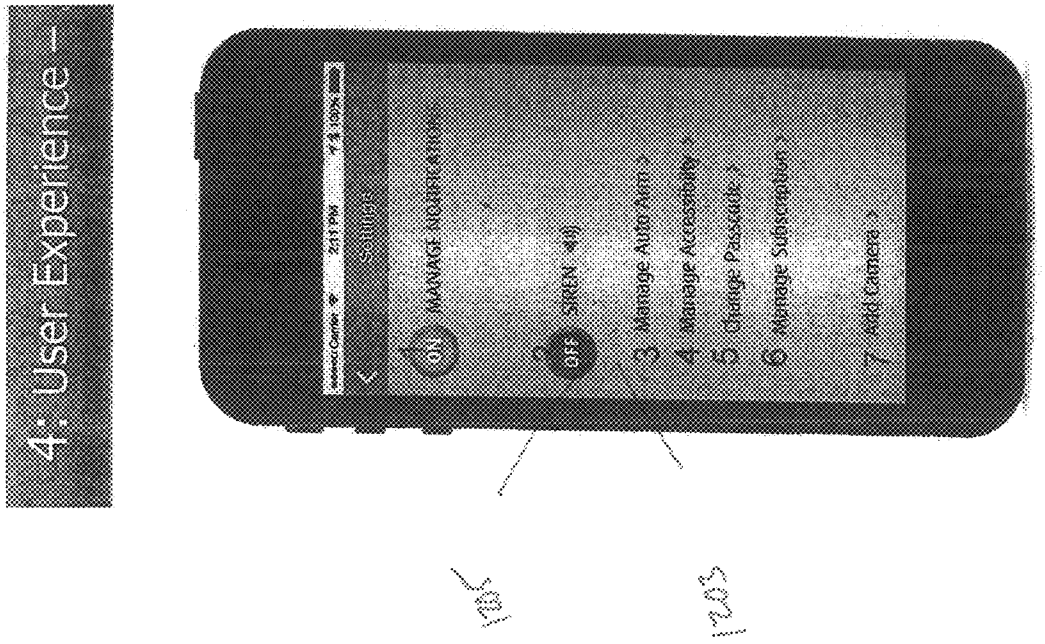
FIG. 12 provides an embodiment of a settings screen in an embodiment of an application implementing the systems and methods.

In an embodiment, the application may include a settings screen (1203). An embodiment of a settings screen (1203) is depicted in FIG. 12. This screen (1203) may be accessed by selecting the settings button from the home screen (903). In an embodiment, the settings screen (1203) may comprise user input and output components, including, without limitation: siren on/off (1205); motion sensor settings (sensitivity, delay, etc.); LED indicator on/off; manage pass code; manage IR illuminator; manage auto arm; manage accessibility; and/or manage subscription.

The application (900) may include other features or functions, including, without limitation, a manage auto arm screen, a manage accessibility screen, a manage subscription screen, a manage camera settings screen, a manage pass code screen, a pass code screen, and a screen for managing cameras or other intrusion detection systems within a particular device, or adding new monitors (100).

In an embodiment, the application (900) communicates with the intrusion detection system (100) to implement an auto arm feature. Because the intrusion detection system (100) can be used as a standalone device (100) without the use of intervening third-party servers or monitoring services, the intrusion detection monitor (100) is generally monitored and administered via a user device (823), such as a smart phone or tablet computer. Because most modern smart phones and tablet computers and other user devices (100) include location technology, the approximate distance from the intrusion detection monitor (100) to the user device (900) can be determined. Thus, if the application (900) determines that the device (823) on which it is running is located more than some threshold distance away from the intrusion detection monitor(100), the application can be configured to automatically arm the monitor (100), whether or not the user has remembered to do so. Thus, the user may simply leave his or her residence, and, as the user moves further away, the system (100) will automatically arm itself. This can be done whether or not the application (900) is running in the foreground, using background application functionality. Alternatively, monitor (100) may itself implement this technology, such as by frequently communicating with the paired user device to request its location, and, if the location exceeds some certain threshold, the intrusion monitor (100) automatically arms itself. In an embodiment, the threshold distance is 25 meters, 50 meters, or 100 meters. In an alternative embodiment, the threshold may use alternative units, such as feet, yards, or miles. In a situation where multiple users are monitoring the same system (100), the auto arm feature may operate only if all users are determined to be at least some threshold distance away from the device.

While the inventions have been disclosed in connection with certain preferred embodiments, this should not be taken as a limitation to all of the provided details of any invention. Modifications and variations of the described embodiments may be made without departing from the spirit and scope of any invention herein disclosed, and other embodiments should be understood to be encompassed in the present disclosure as would be understood by those of ordinary skill in the art.

The invention claimed is:

1. A computer-implemented method for detecting an unauthorized intruder comprising:

receiving, by an application executing on a handheld user device communicably coupled to an intrusion detection system over a wireless telecommunications network, a digital video feed comprising digital video data generated by said intrusion detection system placed in a residence;

displaying, by said application on a display of said handheld user device, said received digital video feed;

displaying, by said application on said display, a graphical user interface comprising a user input component configured for a user of said handheld user device to indicate whether said displayed digital video feed indicates the presence of an unauthorized intruder in said residence;

receiving, from said user via said user input component, an indication that said displayed digital video feed indicates the presence of an unauthorized intruder in said residence; and in response to said received indication of the presence of an unauthorized intruder in said residence, storing on a non-volatile computer-readable medium of said handheld device a copy of said received digital video feed.

2. The method of claim 1, wherein said handheld user device is communicably coupled to said intrusion detection system only via a private local wireless network.

3. The system of claim 2, wherein said local private wireless network is administered by a residential wireless router.

4. The system of claim 2, wherein said private local wireless network is a non-virtual network.

5. The system of claim 1, wherein said handheld user device is a smart phone or tablet computer.

* * * * *